United States Patent [19]

Gupta et al.

[11] Patent Number: 5,127,092
[45] Date of Patent: Jun. 30, 1992

[54] APPARATUS AND METHOD FOR COLLECTIVE BRANCHING IN A MULTIPLE INSTRUCTION STREAM MULTIPROCESSOR WHERE ANY OF THE PARALLEL PROCESSORS IS SCHEDULED TO EVALUATE THE BRANCHING CONDITION

[75] Inventors: Rajiv Gupta, Ossining; Michael A. Epstein, Spring Valley, both of N.Y.

[73] Assignee: North American Philips Corp., New York, N.Y.

[21] Appl. No.: 366,570

[22] Filed: Jun. 15, 1989

[51] Int. Cl.⁵ ............................................. G06F 15/16
[52] U.S. Cl. ........................ 395/375; 364/931.4; 364/931.41; 364/931.42; 364/938; 364/938.1; 364/973; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 4,344,134 | 8/1982 | Barnes | 364/200 |
| 4,365,292 | 12/1982 | Barnes et al. | 364/200 |
| 4,412,303 | 10/1983 | Barnes et al. | 364/900 |
| 4,807,115 | 2/1989 | Torng | 364/200 |
| 4,837,676 | 6/1989 | Rosman | 364/200 |
| 4,847,755 | 7/1989 | Morrison et al. | 364/200 |
| 4,870,614 | 9/1989 | Quatse | 364/900 |
| 4,891,787 | 1/1990 | Gifford | 364/900 |
| 5,050,068 | 9/1991 | Dollas et al. | 364/200 |
| 5,050,070 | 9/1991 | Chastain et al. | 364/200 |

Primary Examiner—Thomas C. Lee
Assistant Examiner—William M. Treat
Attorney, Agent, or Firm—Jack D. Slobod

[57] ABSTRACT

A Multiple Instruction Stream Multiple Data Stream (MIMD) parallel processing apparatus and compiling method for effectuating collective branching of execution by the processors includes specialized branch and fuzzy barrier units which operate with respect to special instructions scheduled in unshaded regions of the instruction streams of the processors involved in a collective branch. A special compare instruction is scheduled in a first unshaded region of only one of the processors while a special jump instruction is scheduled in the next unshaded region of the instruction stream of the other involved processors. By the special jump instruction, the other processors use the special compare result which is simultaneously passed to each of them by the branch unit for determining the execution branch. The barrier unit provides fuzzy barrier synchronization assuring that the correct compare result is used in this determination.

13 Claims, 4 Drawing Sheets

APPARATUS AND METHOD FOR COLLECTIVE BRANCHING IN A MULTIPLE INSTRUCTION STREAM MULTIPROCESSOR WHERE ANY OF THE PARALLEL PROCESSORS IS SCHEDULED TO EVALUATE THE BRANCHING CONDITION

RELATED APPLICATION

This application is related to our co-pending U.S. Pat. application, Ser. No. 227,276, entitled "METHOD AND APPARATUS FOR SYNCHRONIZING PARALLEL PROCESSORS USING A FUZZY BARRIER", which was filed on Aug. 2, 1988. Said application is hereby incorporated herein by reference.

BACKGROUND OF THE INVENTION

1. Field of the Invention

The present invention relates generally to multiprocessor apparatus having parallel processors for execution of parallel related instruction streams and the compiling method for generating the streams. In its particular aspects, the present invention relates to apparatus and method for collective branching of execution by the processors.

2. Description of the Prior Art

Multiprocessor techniques for the exploitation of instruction level parallelism for achieving increased processing speed over that obtainable with a uniprocessor are known for VERY LONG INSTRUCTION WORD (VLIW) machine architecture. A theoretical VLIW machine consists of multiple parallel processors that operate in lockstep, executing instructions fetched from a single stream of long instructions, each long instruction consisting of a possibly different individual instruction for each processor. A run-time delay in the completion by any one processor of its individual instruction, due to unavoidable events such as memory access conflicts, delays the issuance of the entire next long instruction for all processors.

Known MULTIPLE INSTRUCTION STREAM MULTIPLE DATA STREAM (MIMD) architecture enables processors to operate independently when the long instructions are partitioned into separate or multiple streams. By independence, we mean that a run-time delay in one stream need not immediately delay execution of the other streams. Such independence however, cannot be complete since a mechanism must be provided to enable the processors to periodically synchronize at barrier points in the instruction streams. In the prior art, such barrier points have been fixed and processors have been equipped for issuing an "I GOT HERE" flag to a barrier coordinating unit when a barrier is reached by the processor, which then stalls or idles until receipt said unit of a "GO" instruction issued when all processors have issued their "I GOT HERE" flag. Illustrative are U.S. Pat. Nos. 4,344,134; 4,365,292; and 4,212,303 to Barnes individually or with others.

Heretofore, lockstep operation of parallel processors has been necessary for the execution of a branching instruction, i.e. the evaluation of a condition, testing the resulting value, and executing a branch, such as selectively jumping to an instruction address based upon or defined by the result of the test. The lockstep operation ensures that the various processors take the same branch or jump. While collective branching is important to fully exploit instruction level parallelism, the prior art has generally restricted multiple instruction stream architecture to execution of programs with no data-dependent branching (see for example said U.S. Pat. No. 4,365,292 at column 3, lines 48-53).

SUMMARY OF THE INVENTION

In accordance with the principles of the invention, an instruction for the evaluation and testing of a condition to be used for collective branching by a plurality of processors is scheduled on only one of the processors as a "special compare" instruction. Means are provided coupling the processors in a manner that the result of the special compare instruction is made available to or passed to the other processors involved in the collective branching. Each other involved processor executes a "special jump" instruction which utilizes the passed special compare result for determining, when the special jump instruction is executed, the location or address of the next instruction in said processor's instruction stream. In the instruction stream of the processor which evaluated the special compare instruction and subsequent to or downstream from said instruction, is generally provided a "regular jump" instruction which uses the compare result locally generated by that processor for execution of its own jump instruction.

To assure that all processors involved in execution of collective branching take the same execution branch, it is necessary that the processors be synchronized. By the term "synchronized" we mean merely that data or logical dependence between the instruction streams are sufficiency resolved to assure that each jump instruction is evaluated based on the same special compare result. Thus, a special jump cannot be executed until after a special compare result is passed and a new special compare result cannot be passed until all processors involved in the last collective branch have used the last special compare result.

While fixed barriers may be interposed in the multiple instruction streams to force previously known "synchronizations" of the kind where processors idle at a fixed barrier until the last processor reaches the barrier, we have found that a "fuzzy barrier" as described in our co-pending application aforementioned provides the necessary level of synchronization without the consequent delays of previously known fixed barriers.

Thus, in compiling source code (typically originally written for serial execution on a uniprocessor) in order to schedule instructions into parallel streams for parallel processor execution, the streams are divided into alternating corresponding "shaded" and "unshaded" regions. "Shaded regions" contain instructions which are data independent from instructions in other streams (or are otherwise inherently synchronized in writing and reading shared resources so as to not require barrier synchronization) while unshaded regions contain instructions which require barrier synchronization principally because they use data generated by another processor, typically in the immediately preceding unshaded region of the other processor's instruction stream.

According to the principles of the invention, fuzzy barrier means are provided in which each processor has means for identifying shaded and unshaded regions in its instruction stream and means for receiving a "want_in" signal from each other processor indicating when each other processor wants to synchronize. The barrier means further includes a state machine for selectively generating a "want_out" signal indicating when the processor wants to synchronize and a signal for selectively stalling or idling execution of the processor.

In accordance with the further principles of the invention, the special compare instruction is scheduled in a first unshaded region of the instruction stream of only one of the processors and the special jump instruction is scheduled in the next following or second unshaded region of the one or more other processors involved in the branch, there being a shaded region intermediate the first and second unshaded regions. The regular jump instruction in the stream of the one processor which evaluates the special compare instruction is scheduled in a second unshaded region which corresponds to the second unshaded region in which the special jump is scheduled in the instruction streams of the other involved processors.

The fuzzy barrier means assures synchronization of the type that processors reaching the end of corresponding shaded regions, before synchronization, will stall until the last processor has at least entered its corresponding shaded region. Upon such entry of the last processor, synchronization takes place and processors are free to pass to the next following unshaded region and the next following shaded region, where, upon entry, they individually issue a want_out signal directed to the other processors indicating a desire to synchronize. In contradistinction to prior art fixed barrier methods, the processors continue to execute instructions in the shaded region while waiting for synchronization. If synchronization has not yet occurred when the end of the shaded region is reached by a processor it will stall while continuing to issue the want$_{13}$ out signal. Synchronization will occur when all processors issue a want_out signal which synchronization generally cause the want_out signals to be reset. It is thus apparent that scheduling the special compare instruction in an unshaded region of one processor's instruction stream, and scheduling the regular jump and special jump instructions in the next following corresponding unshaded regions of the instruction streams will not allow any jump to be executed until the special compare has been first evaluated and will not allow a special compare to be evaluated unless the immediately preceding unshaded region has been passed by all processors.

In order for barrier synchronization to achieve this result, it is generally necessary that upon evaluation of the special compare result by one processor, the result is substantially simultaneously passed to all processors involved in the collective branch. Accordingly, data exchange means are provided especially for passing a special compare result word much more rapidly than possible by writing and reading shared memory or shared register channels which data exchange means further obviate the possibility of conflicts in or blocking on these shared resources.

As explained in more detail in our co-pending application in relation to the fuzzy barrier, since the number of instructions in the shaded regions of the instruction streams (for example that shaded region intermediate the first and second unshaded regions) provides a cushion for non-idling instruction execution while awaiting synchronization, the instructions should be compiled in accordance with a method that instructions are scheduled in the unshaded regions to maximize the size of or number of instructions in such regions. Accordingly, in the compiler method according to our co-pending application as applied to the collective branching instructions, serial instruction code is separated into separate parallel streams in which corresponding unshaded and shaded regions have been identified and with the special compare instruction in the unshaded region of one stream and the special jump instructions in the next following unshaded region of the other instruction streams involved in the collective branching. Furthermore, the stream instructions are thereafter reordered to move those instructions into the shaded region intermediate the aforementioned unshaded regions which, prior to reordering, are downstream from said shaded regions but may be earlier executed without compromising downstream data dependencies.

BRIEF DESCRIPTION OF THE DRAWING

Other objects, features and advantages of the present invention will become apparent upon perusal of the following detailed description of the preferred embodiments when taken conjunction with the appended drawing wherein.

DETAILED DESCRIPTION OF THE PREFERRED EMBODIMENTS

Figure 1:
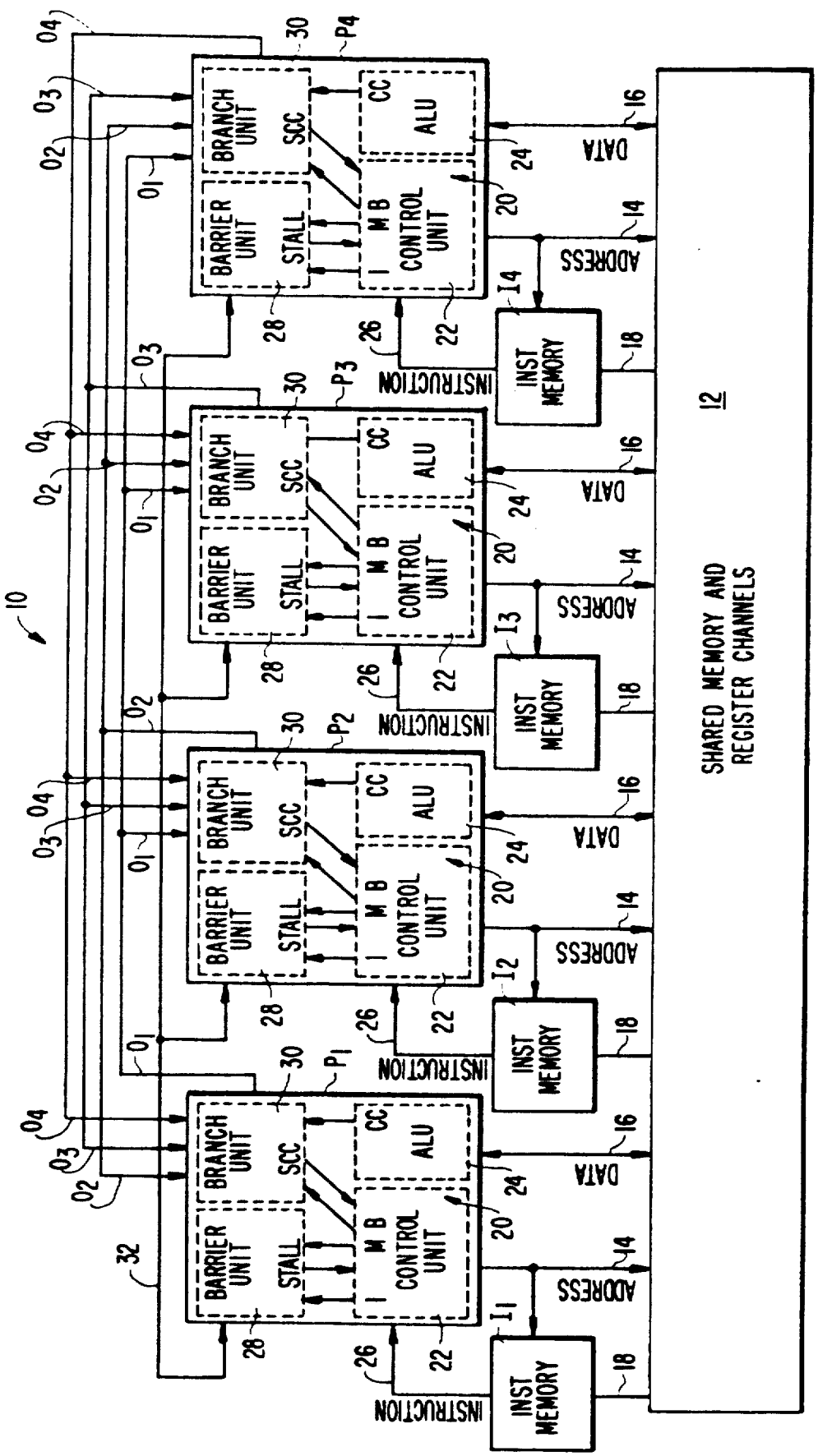
FIG. 1 is a block diagram of a multiprocessor according to the present invention, each parallel processor thereof including a barrier unit and a branch unit.

Referring first to FIG. 1 of the drawing, there is schematically illustrated a multiprocessor apparatus 10 in processors in Multiple Instruction Stream Multiple Data Stream (MIMD) configuration. Four processors are shown designated P1, P2, P3, and P4, said number being chosen both for the purposes of illustration and as a number of processors which may be feasibly integrated together on a single chip. Each of processors P1-P4 is preferably both identical and symmetrically connected in the multiprocessor 10 to allow for flexibility for scheduling operations in individual instruction streams for processing in parallel by the processors P1-P4.

Processors P1, P2, P3 and P4 respectively have their own dedicated instruction memories 11, 12, 13 and 14 for sequential instructions forming the respective instruction streams. There are also shared memory and register channel resources 12 which have address input lines 14 and bi-directional data lines 16 to the respective processors P1-P4. The memory 12 is shared in that any memory location can be written or read by any processor utilizing a suitable cross bar (not shown) forming a part of memory 12. Instruction memories 11-14 may operate as caches for instruction sequences fetched, when needed, from shared memory 12 via lines 18.

A limited number of register channels preferably included in these shared resources provide means for more rapidly passing data between processors than can be obtained using the shared memory portion of shared resources 12. Each register channel may be written and read by the processors in the nature of a register, and also has an associated communication protocol or synchronizing bit, in the nature of channel, which indicates, for example, whether the register channel is full or empty. Such register channels provide inherent synchronizations between processors because a processor cannot read a register channel until after it is written by another processor. While such register channels could conceivably be used to pass data in a synchronized fashion between processors for accomplishing a collective branching instruction, the limited number of such register channels and the delays caused by strategies to avoid blocking on said register channels calls for a more aggressive solution utilizing specialized hardware for both collective branching and the synchronization thereof.

The processors P1-P4, each comprise an execution means 20 consisting of a control unit 22 which is coupled to an arithmetic and logical unit (ALU) 24. Control units 22 of the respective processors P1-P4 receive instructions from the respective instruction memories 11-14 on lines 26 and issue addresses to the respective instruction memories as well as to the shared memory and register channels on lines 14. The data lines 16 are bi-directionally coupled to the ALU 24 of each processor.

The processors P1-P4 each further comprise specialized hardware in the form of a barrier unit 28 and a branch unit 30. Barrier unit 28 is for coordinating synchronization of the processors P1-P4 with respect to fuzzy barriers established in the instruction streams of the processors as described in our aforementioned copending patent application. Branch unit 30 is for providing a collective branching result word to processors P1-P4, or a sub-group of them involved in branching parallel instructions, with the aid of the fuzzy barrier synchronization provided by barrier unit 28. Each of branch units 30 has output lines "Oi" which form inputs to the branch units 30 of the other processors and receives similar inputs from each of the other processors. Barrier units 28 are similarly connected to each other which connections are represented schematically as the bi-directional coupling 32 in FIG. 1.

Figure 3:
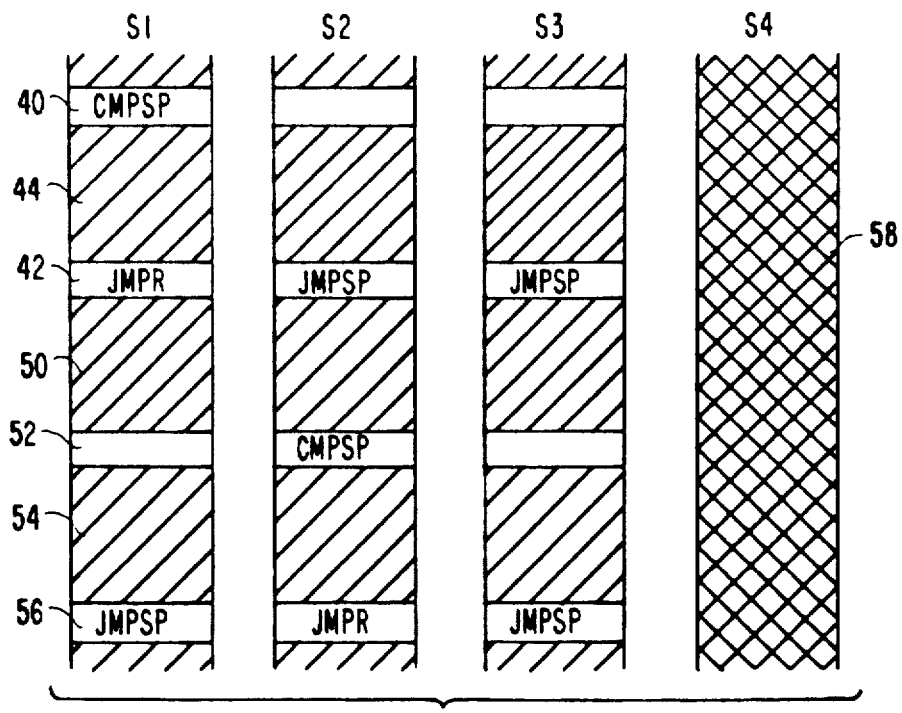
FIG. 3 is a representation of corresponding instruction streams for the parallel processors in FIG. 1.
Figure 6:
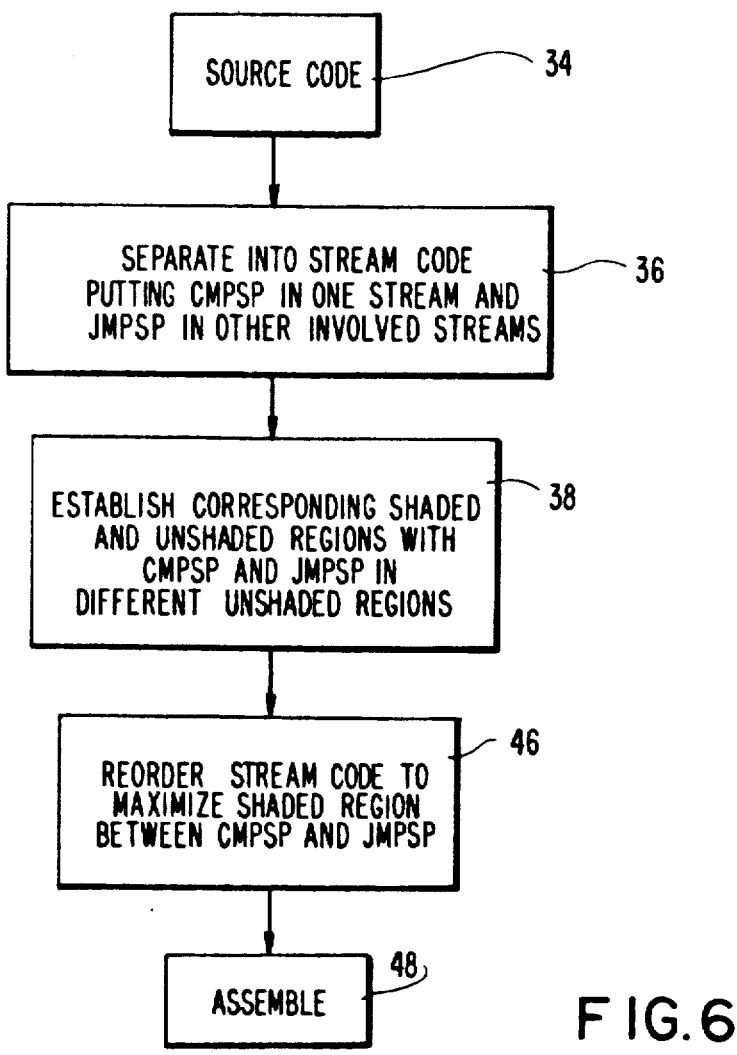
FIG. 6 is a flow chart for the compiling method in accordance with the invention.

The nature and purpose of both the branch unit 30 and the barrier unit 28 as well as the interaction between units 28 and 30 of each processor with units 28 and 30 of the other processors and the interactions within each processor between such units and execution means 12 are best understood by reference to FIGS. 3 and 6.

FIG. 3 shows streams S1-S4 of illustrative instructions for the respective processors P1-P4 in which execution progresses downwardly. For the purpose of example, streams S1, S2 and S3 contain related instructions so that processors P1, P2 and P3 are involved in a sequence of two collective branches while stream S4 contains unrelated instructions for execution by processor P4. Under such circumstances, processor P4, not being involved in the collective branch, is "masked out" by barrier unit 28 in a manner which will be later discussed.

The instructions contained in the streams are preferably derived by a compiling process which is illustrated by the flow chart in FIG. 6. Therein, compiling begins with the source code 34 and in step 36 there is derived a parallel stream code using techniques for VERY LONG INSTRUCTION WORD (VLIW) compiling such as taught by R.P. Colwell et al "A VLIW Architecture For A Trace Scheduling Compiler", Proc. Second International Conf. On Architectural Support For Programming Languages And Operating Systems, pp. 180-182, 1987. Furthermore, in accordance with the principles of the invention, the stream code is developed in step 36 so that the testing and evaluation of a branching condition is scheduled on only one of the processors as a "special compare" (CMPSP) instruction (such as in S1, FIG. 3) and the subsequent related "special jump" (JMPSP) instruction is scheduled on all other processors involved in the collective branch (such as in region 42 in S2 and S3 in FIG. 3) which other processors receive the results of the special compare performed by P1 via the branch unit 30. Processors P2 and P3 use the CMPSP result received to take the execution branch indicated thereby (i.e. determine the address of the next instruction).

In the stream S1, corresponding to the scheduling of JMPSP in streams S2 and S3, there is scheduled a "regular jump" (JMPR) instruction by which processor P1 is instructed to use the locally generated CMPSP result to determine which branch it takes. Thus, each of processors P1-P3, involved in the collective branching, are to take the same branch, but not necessarily at the same instant. Because each of processors P1-P4 make variable progress in executing instructions in the respective streams S1-S4, barrier synchronization is necessary to insure that a JMPSP is executed only after the corresponding CMPSP result has been posted to the branch unit 30 and that the next CMFSF result is not posted to branch unit 30 until the last CMPSP result has been used by all involved processors.

This barrier synchronization is provided by barrier unit 28 which operates with respect to identified "shaded" and "unshaded" regions in the instruction streams. Accordingly, step 38 is performed after step 36 wherein corresponding shaded and unshaded regions are established in the respective instruction streams. As indicated in our co-pending application, this can be done by having instructions include a bit which describes the region in which said instructions lie or by scheduling region boundary instructions in the streams. Shaded regions contain only instructions which are independent and/or do not require barrier synchronization because they are otherwise synchronized as by the register channels contained in shared resources 12. Unshaded regions contain instructions which are dependent on mathematical or logical data generated by another processor, which will not necessarily be available when needed without barrier synchronization.

The nature of the fuzzy barrier established with respect to these shaded and unshaded regions is that the involved processors will be said to be synchronized only when each has at least reached its corresponding shaded region. The processors continue to execute instructions in the shaded regions while waiting to synchronize. If synchronization has not occurred when a processor reaches the end of a shaded region, the processor stalls or idles waiting for the last other processor to reach the shaded region. When the last processor reaches such region, synchronization takes place, and all processors are now permitted to execute instructions in the next following unshaded region and pass thereafter into the next following region where synchronization is similarly sought. Consequently, with fuzzy barrier synchronization, in view of the shaded region intermediate sequential first and second unshaded regions, the first unshaded region must be fully executed by all involved processors before any executes an instruction in the second unshaded region. Accordingly, a first set of corresponding unshaded regions 40 is established in streams S1, S2 and S3 (FIG. 3) with the CMPSP instruction scheduled in region 40 of stream S1 only. The related JMPR and JMPSP instructions are scheduled in second corresponding unshaded regions 42 in streams S1, S2 and S3 with the JMPR instruction in stream S1, and the JMPSP instruction in streams S2 and S3. Intermediate the unshaded regions 40 and 42 is a shaded region 44 in each of streams S1, S2 and S3.

Further in accordance with the compiling method, the number of instructions in shaded regions such as 44 is maximized in step 46 by reordering the stream code to move those later occurring instructions which can be safely executed earlier without compromising data dependencies, into the earlier occurring shaded region. This increases the cushion for non-idling synchronization between the involved processors. The reordering method is more fully described in our co-pending application. As a final step 48, the reordered stream code is assembled.

In accordance with the principles of the present invention, in order to simplify the branch unit 30, only one set of processors can be involved during any shaded region in a collective branch. However, a different processor can be scheduled to execute a CMPSP instruction for a subsequent collective branch. Thus, there is further illustrated in FIG. 3, a second collective branching by a shaded region 50 and an unshaded regior 52, next following, in which CMPSP is scheduled in stream S2. Regions 50 and 52 establish fuzzy barrier synchronization such that each involved processor uses the CMPSP result posted by P1 prior to the next CMPSP being executed by P2. Operation with respect to the next following shaded region 54 and unshaded region 56 thereafter in which JMPR is scheduled in stream S2 and JMPSP is scheduled in streams S1 and S3 should be apparent from the first collective branching heretofore described. While processor P4 is illustrated in FIG. 3 as being "masked out" and operating throughout in an unrelated shaded region, it can synchronize and join in related processing when "masked in".

It should be further understood that not all branching of the processors need be collective, there being instances where one or more processors may branch individually within the context of a program. For such circumstances, a regular compare instruction (CMPR) is provided, the result of which is used locally by a subsequent JMPR instruction and not passed to the other processors via branch unit 30.

Figure 2:
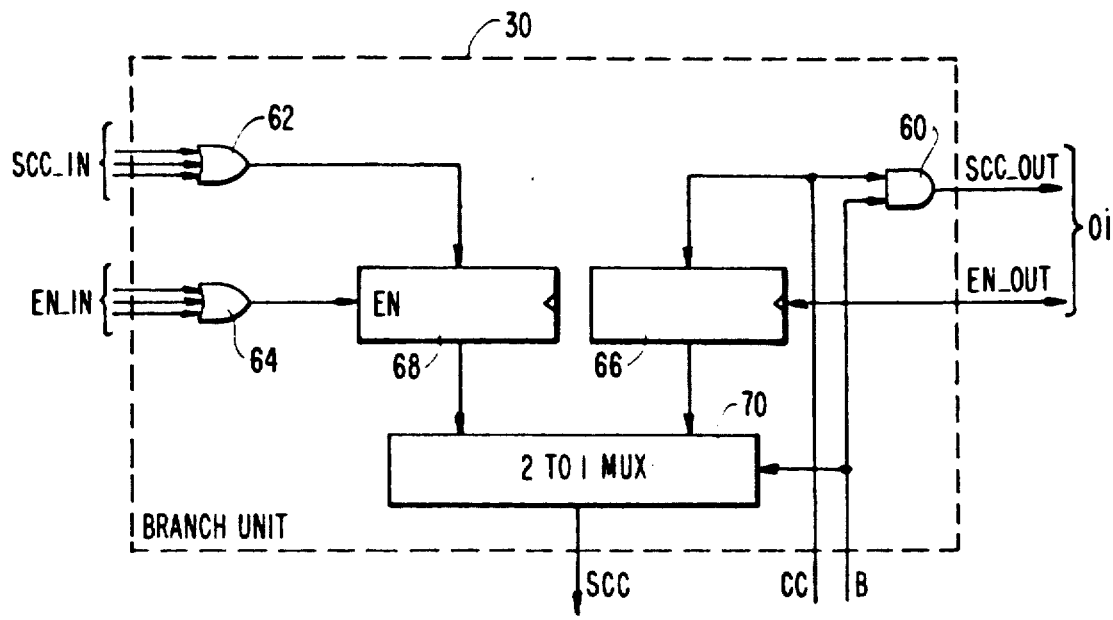
FIG. 2 is a block diagram of a branch unit in FIG. 1.

The operation of branch unit 30 will now be described with reference to FIGS. 1 and 2. In the processor on which the CMPSP instruction is scheduled, CMPSP will be evaluated in ALU 24 and the multibit result word provided as a parallel input "cc" to the branch unit 30. Further, a single bit output B is provided by the control unit indicating, when logical "1", the posting of the CMPSP result word to the branch unit by said processor, which output acts as an "enable" for said result word. Thus, the individual bits of "cc" are separately gated by B in an array of AND gates 60 (one for each bit of "cc") producing a parallel first output "scc_out" while "B" alone produces a single bit second output "en_out", these first and second outputs together comprising Oi.

The outputs scc_out and en_out from the other three processors form three parallel inputs scc_in and three single bit inputs en_in. Corresponding bits of the three inputs scc_in are input to an array of OR gates 62 while inputs en in are input to OR gate 64, the outputs of which form the enable for a latch 68 for the parallel output of the array of OR gates 62. Thus, latch 68 will contain a special compare result evaluated by another of the processors. A 2 to 1 multiplexer 70 receives alternative parallel inputs from the outputs of latches 66 and 68 while B provides a selection signal such that, in the processor which evaluated CMPSP (where B goes to logical "one") the output of latch 66 is passed by multiplexer 70 to its output scc, while in the processors which receive the CMPSP result from another processor (where B remains at logical "zero"), the output of latch 68 is passed by the multiplexer 70 to output scc.

Figure 4:
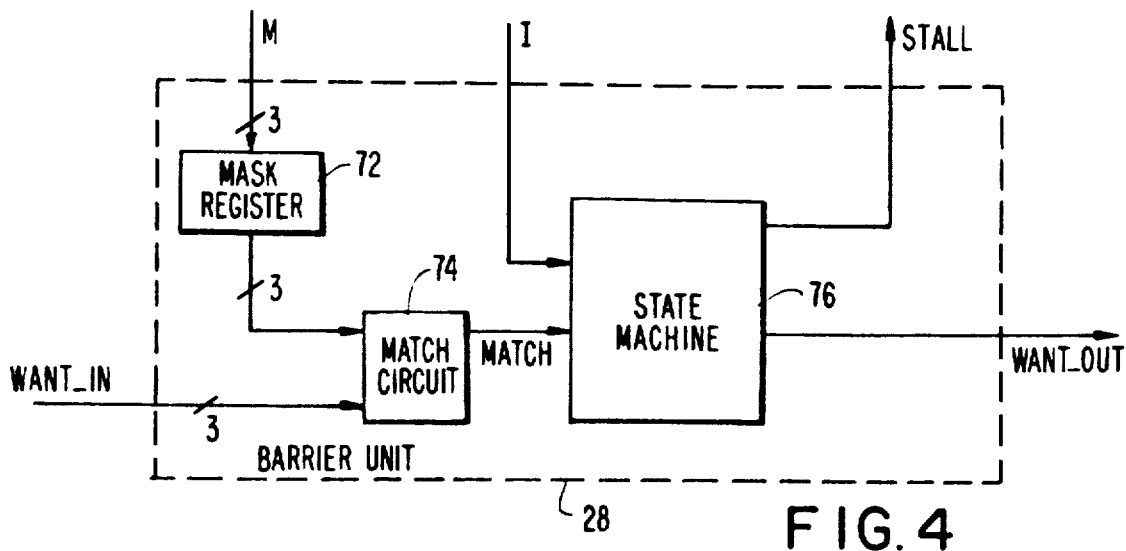
FIG. 4 is a block diagram of the barrier unit in FIG. 1 including a state machine.
Figure 5:
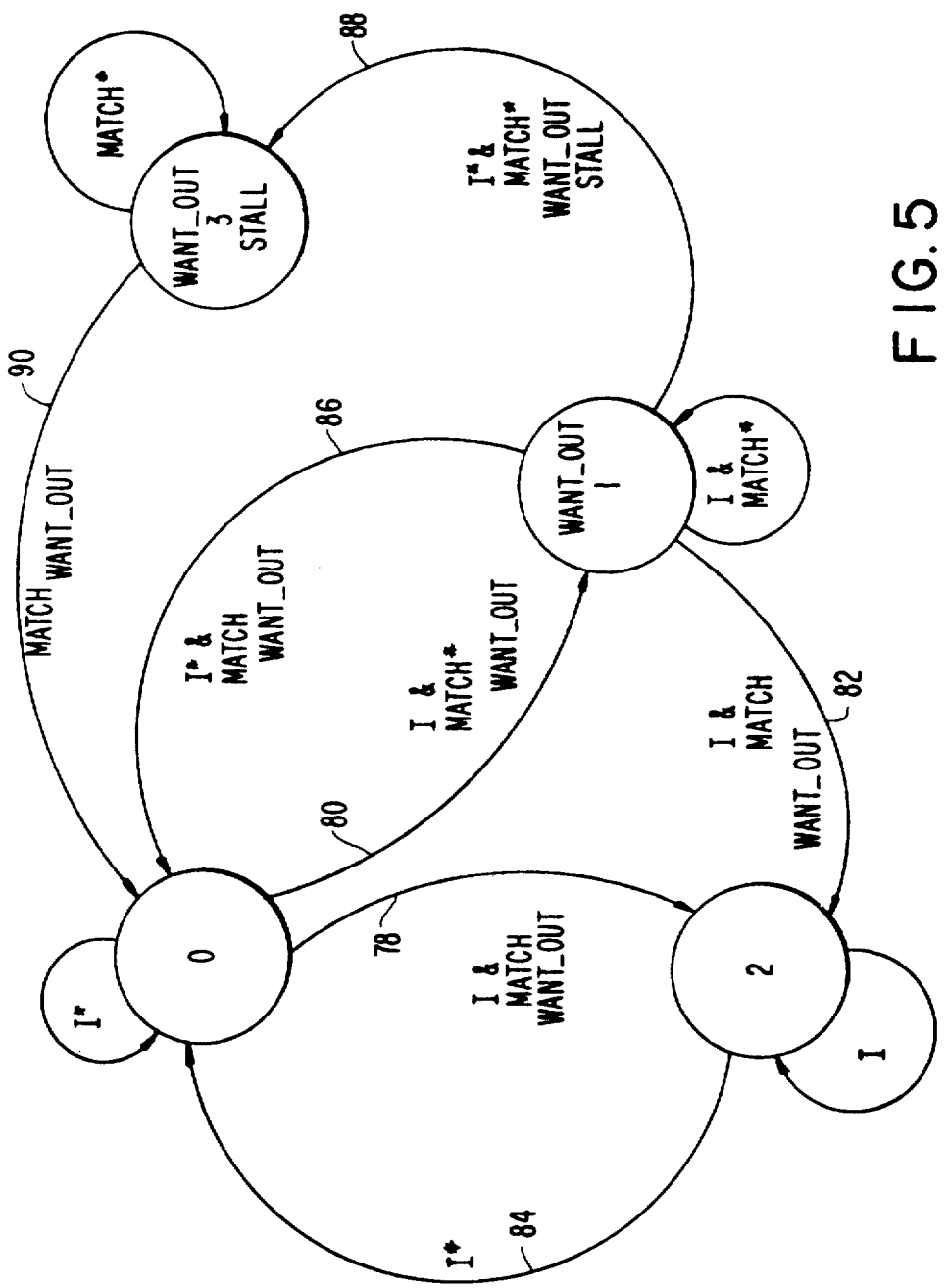
FIG. 5 is a state diagram for the state machine in FIG. 4.

The barrier unit 28 is now described in conjunction with FIGS. 1, 4 and 5. The barrier unit 28 of each processor receives a want_in signal from the barrier units of each of the other processors and receives a mask signal M and a region identifying signal I from the control unit 22 of said processor. Mask signal M, which is loaded into a mask register 72, is derived by control unit 22 from instructions in said processor's instruction stream and indicates which other processors are involved with said processor in barrier synchronization. Mask signal M has a different bit position for each other processor; one logical state of a bit indicates that the other processor associated with the bit position is involved or "masked in" and the opposite logical state indicates that the associated other processor is "masked out". The parallel output of mask register 72 and the want_in signals from the other barrier units are applied to a match circuit 74 which provides a MATCH signal at its output when all other processors which are "masked in" have issued a want_in signal. Match circuit 74 is further described in our aforementioned copending application and is easily implemented by one of ordinary skill in the art. The match circuit output, which is logical "1" when a match is achieved, and the region identity signal I, which is logical "1" or occurs when said processor is operating in a shaded region of its instruction stream, are input to a state machine 76.

State machine 76 has the state diagram of FIG. 5 and generates a want_out signal, which forms one of the want_in signals to the barrier unit 28 of each of the other processors, and a stall signal (indicated in the state diagram when activated as "STALL") directed to said processor's control unit 22 to selectively stall or idle further instruction execution by said processor. Want_out signals occur or are logical "1" when the processor generating said signal has not synchronized and wants to synchronize, said occurrence or logical "1" state being indicated as "WANT_OUT" in the state diagram. The I signal generated by a control unit 22 occurs or is logical "1" when the processor is operating in a shaded region and is logical "0" when the processor is either stalled at the end of the shaded region or is operating in an unshaded region.

As shown in the state diagram of FIG. 5, where the possible input states and their complements are indicated as "MATCH" , "MATCH*", "I" AND "I*", state machine 76 has four states as follows State "0" where, synchronization having occurred, the processor operates in an unshaded region;

State "1" where the processor operates in a shaded region waiting to synchronize;

State "2" where the processor operates in a shaded region and has already synchronized; and State "3" where the processor is stalled at the end of a shaded region waiting to synchronize.

In state 0, state machine 76 will neither issue WANT_OUT nor STALL. It will remain in state 0 as long as I* (unshaded region) is true. When the shaded region is encountered I becomes true causing either transition 78 to state 2 or transition 80 to state 1 depending upon whether MATCH or MATCH* is true. In transition 78 WANT_OUT is maintained during the transition and discontinued or reset at state 2, indicating the occurrence of synchronization. In transition 80, WANT_OUT is maintained both during the transition and on reaching state 1 indicating that the processor is in the shaded region and wants to synchronize. State machine 76 remains in state 1 as long as I is true and MATCH* is true. If MATCH is true before the end of the shaded region is reached, transition 82 will be taken from state 1 to state 2 wherein WANT_OUT is maintained during the transition and reset when state 2 is reached in view of the occurrence of synchronization.

State 2 is maintained as long as I is true, but when the unshaded region is encountered I* becomes true and the transition 84 from state 2 to state 0 is taken.

Furthermore, if MATCH and I* become true simultaneously, corresponding to a match occurring precisely upon reaching the end of a shaded region, the direct transition 86 from state 1 to state 0 is taken. WANT_OUT is maintained during that transition and reset on reaching state 0.

If however, while in state 1, the end of the shaded region is encountered prior to the occurrence of synchronization (I* true and MATCH* true), the transition 88 to state 3 is taken. During this transition WANT_OUT is maintained while STALL is activated, which conditions are maintained during state 3.

As long as MATCH* is true, state machine 76 remains in state 3. Once MATCH is true, transition 90 is taken from state 3 to state 0 where the processor may now proceed to the next unshaded region. WANT_OUT is maintained during this transition and reset upon reaching state 0.

It should now be apparent that barrier unit 28 provides the necessary synchronization in conjunction with the branch unit 30 to achieve collective branching. While the invention has been described in specific detail it should be appreciated that numerous modifications, additions and/or omissions in these details are possible within the intended spirit and scope of the invention. For example, branch unit 28 and barrier unit 30 could be more closely integrated into a single unit and/or the resulting hardware could be simplified by requiring that all CMPSP instructions be scheduled on the same processor.

What is claimed is:

1. A digital processing apparatus for executing in parallel first and second streams of ordered instructions which streams may include instructions for conditional branching of execution of said streams from related conditional regular and special jump instructions respectively in said first and second streams to respective next instructions not immediately following said related regular and special jump instructions in said respective streams comprising a special compare instruction in said first stream preceding said regular jump instruction for evaluation of a condition, as a special compare result, determinitive of whether a branching in execution is to be taken at said related regular and special jump instructions in executing both said first and second streams, said apparatus comprising:

first and second processors for respectively executing said first and second streams of instructions;

said first processor comprising means for executing a special compare instruction in order to produce a special compare result;

data exchange means coupled to said first and second processors for making the special compare result from the first processor available to the second processor; and said second processor comprising means for executing a special jump instruction, if encountered in the second stream dependent on the special compare result available to said second processor.

2. The apparatus of claim 1 wherein said first processor further comprises means for executing a regular jump instruction in said first stream related to said special jump instruction in said second second stream dependent on the special compare result.

3. The apparatus of claim 1 further comprising means for synchronizing said first and second processors to assure that said second processor does not execute a special jump instruction until after the special compare result has been made available by the first processor.

4. The apparatus of claim 1 wherein said apparatus is for executing a third stream of instructions in parallel with said first and second streams, which third stream may include a special jump instruction related to said special compare instruction, and wherein said apparatus further comprises a third processor for executing said third stream of instructions;

said third processor comprising means for executing a special jump instruction, if encountered in the third stream, dependent on the special compare result.

5. The apparatus of claim 4 wherein said data exchange means is coupled between said first, second and third processors and is for passing said special compare result from said first processor substantially simultaneously to said second and third processors.

6. The apparatus of claim 5 further comprising synchronizing means for synchronizing said first, second and third processors to assure that neither said second nor said third processor executes a special jump instruction until after the special compare result has been passed by the first processor.

7. The apparatus of claim 3 wherein said synchronizing means comprises a communication means coupled between said first and second processors for communicating a signal indication from said first processor to said second processor that said first processor wants to synchronize.

8. The apparatus of claim 3 wherein said first and second streams of instructions each may comprise a related sequence of three regions:

a first unshaded region, a shaded region, and a second unshaded region, said special compare instruction being in the first unshaded region of the first stream and the special jump instruction being in the second unshaded region of the second stream and wherein said synchronizing means comprises means in said second processor for identifying shaded and unshaded regions in the second instruction stream and means for stalling execution of said second processor at the end of said shaded region if said first processor has not yet entered the shaded region.

9. The apparatus of claim 8 further comprising a communication means coupled between said first and second processors for communicating a signal indication from said first processor to said second processor that said first processor wants to synchronize.

10. A digital processing apparatus for executing in parallel a plurality of streams of instructions which streams may be divided into corresponding shaded and unshaded regions, said shaded regions containing instructions which do not use data generated from instructions in other streams and said unshaded regions containing instructions which do use data generated by instructions in other streams, and which streams may include instructions for branching of execution of said streams comprising a special compare instruction in a first unshaded region in any one of said streams for evaluation of a condition, as a special compare result, determinitive of whether a branching in execution of said streams is to be taken and a related conditional special jump instruction in a second unshaded region in other of said streams for determination, based on said special compare result, whether execution will branch to a next instruction not immediately following said special jump instruction, there being a shaded region intermediate said first and second unshaded regions, said apparatus comprising:

- a plurality of processors for respectively executing said plurality of streams of instruction;
- each processor comprising means for executing a special compare instruction in order to produce a special compare result;
- means coupled between said plurality of processors for passing a special compare result from said any one of said processors to the other of said processors;
- each processor comprising means for executing a special jump instruction dependent on a related special compare result passed; and
- means for regionwise synchronizing said plurality of processors to ensure that instructions in said second unshaded region are not executed until all processors have at least reached their respective shaded regions.

11. The apparatus of claim 10 wherein said means for regionwise synchronizing said processors comprises:
- means in each processor for identifying whether said processor is currently operating in a shaded or unshaded region;
- means in each processor for receiving _want in signal from each of said other processors indicative of when said other processors want to synchronize; and
- controlling means responsive to said region of operation identification and to said want_in signals for selectively generating a want_out signal for transmission to said other processors and for selectively stalling execution of the instruction stream for said processor.

12. The apparatus of claim 11 wherein said means for regionwise synchronizing said processors comprises a state machine in each processor having the following four states:
a) a first state during which the processor executes instructions in an unshaded region;
b) a second state during which the processor executes instructions in the shaded region while waiting for other processors to reach their respective shaded regions;
c) a third state during which the processor executes instructions in the shaded region when the other processors have reached their respective shaded regions; and
d) a fourth state during which the processor stalls having reached and end of the shaded region, and waits for the other processors to reach their respective shaded regions.

13. A digital processing apparatus for executing in parallel first and second streams of ordered instructions which streams may include instructions for conditional branching of execution of said streams from related conditional regular and special jump instructions respectively in said streams to respective next instructions not immediately following said related regular and special jump instructions in said respective streams comprising a special compare instruction in either of said streams preceding said regular jump instruction for evaluation of a condition, as a special compare result, determinitive of whether a branching in execution is to be taken at said related regular and special jump instructions in executing both said streams, said apparatus comprising:
- first and second processors for respectively executing said first and second streams of instructions;
- each of said first and second processors comprising means for executing a special compare instruction, if present in the instruction in the instruction stream of said processor, in order to produce a special compare result;
- data exchange means coupled to said first and second processors for making the special compare result from either of said processors available to the other; and
- each of said first and second processors comprising means for executing a special jump instruction, if encountered in its respective stream, dependent on the special compare result available to from the other of said processors via said data exchange means.

* * * * *